(12) United States Patent
Week

(10) Patent No.: US 6,546,359 B1
(45) Date of Patent: Apr. 8, 2003

(54) METHOD AND APPARATUS FOR MULTIPLEXING HARDWARE PERFORMANCE INDICATORS

(75) Inventor: Jeremy Week, Broomfield, CO (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/556,441

(22) Filed: Apr. 24, 2000

(51) Int. Cl.[7] .............................................. G21C 17/00
(52) U.S. Cl. ......................... 702/186; 701/35; 712/43; 712/236
(58) Field of Search ................................ 702/118, 119, 702/121, 123, 182, 186; 701/35; 710/6; 712/43, 236; 714/38

(56) References Cited

U.S. PATENT DOCUMENTS

| | | | |
|---|---|---|---|
| 4,675,832 A | 6/1987 | Robinson et al. ............ 345/441 |
| 4,812,996 A | * 3/1989 | Stubbs ........................ 702/123 |
| 5,075,847 A | 12/1991 | Fromme ..................... 717/136 |
| 5,079,707 A | * 1/1992 | Bird et al. ..................... 701/35 |
| 5,301,312 A | 4/1994 | Christopher, Jr. et al. .... 714/32 |
| 5,325,499 A | 6/1994 | Kummer et al. ............. 711/143 |
| 5,325,533 A | 6/1994 | McInerney et al. ............. 717/1 |
| 5,353,401 A | 10/1994 | Iizawa et al. ................ 345/763 |
| 5,438,659 A | 8/1995 | Notess et al. ................ 707/505 |
| 5,499,349 A | 3/1996 | Nikhil et al. .................. 712/26 |
| 5,500,881 A | 3/1996 | Levin et al. .................... 717/3 |
| 5,519,866 A | 5/1996 | Lawrence et al. ............. 717/10 |
| 5,530,816 A | 6/1996 | Holt ............................ 712/217 |
| 5,553,235 A | 9/1996 | Chen et al. .................... 714/20 |
| 5,613,063 A | 3/1997 | Eustace et al. ............... 714/38 |
| 5,636,374 A | 6/1997 | Rodgers et al. ............. 712/230 |
| 5,673,387 A | 9/1997 | Chen et al. .................... 714/38 |
| 5,675,790 A | 10/1997 | Walls .......................... 707/205 |
| 5,675,802 A | 10/1997 | Allen et al. ..................... 717/3 |
| 5,689,712 A | 11/1997 | Heisch .......................... 717/4 |

(List continued on next page.)

FOREIGN PATENT DOCUMENTS

| | | |
|---|---|---|
| DE | 199 34 515 A1 | 1/2000 |
| EP | 0 703 534 A | 3/1996 |
| EP | 0 817 044 A2 | 1/1998 |
| EP | 0 965 921 A2 | 12/1999 |
| EP | 1 024 432 A | 8/2000 |
| EP | 1 081 585 A1 | 3/2001 |
| FR | 2 793 908 A1 | 11/2000 |
| GB | 2 343 029 | 4/2000 |
| GB | 2 357 873 | 7/2001 |
| JP | 3-282731 A | 12/1991 |
| JP | 7-056716 A | 3/1995 |
| WO | WO 99/10812 A | 3/1999 |

OTHER PUBLICATIONS

Broberg et al., "Visualization and Performance Prediction of Multithreaded Solaris Programs by Tracing Kernel Threads", Department of Software Engineering and Computer Science, University of Karlskrona/Ronneby, Sweden, 7 pages.

(List continued on next page.)

Primary Examiner—John S. Hilten
Assistant Examiner—John Le

(57) ABSTRACT

In accordance with methods and systems consistent with the present invention, an improved processor performance instrumentation system is provided that allows a software tester to measure more performance indicators than there are hardware counters during a single execution of a tested program. The improved processor performance instrumentation system accomplishes this by "multiplexing" performance indicators while executing the tested program. In effect, methods and systems consistent with the present invention extend the abilities of the limited number of hardware counters to allow them to measure a number of performance indicators otherwise not allowed during one execution of the tested program.

36 Claims, 4 Drawing Sheets

U.S. PATENT DOCUMENTS

| | | | | |
|---|---|---|---|---|
| 5,710,727 A | | 1/1998 | Mitchell et al. | 702/128 |
| 5,724,262 A | * | 3/1998 | Ghahramni | 702/186 |
| 5,742,793 A | | 4/1998 | Sturges et al. | 711/152 |
| 5,745,897 A | | 4/1998 | Perkins et al. | 707/101 |
| 5,748,961 A | | 5/1998 | Hanna et al. | 717/1 |
| 5,761,426 A | | 6/1998 | Ishizaki et al. | 709/221 |
| 5,774,724 A | | 6/1998 | Heisch | 717/129 |
| 5,784,698 A | | 7/1998 | Brady et al. | 711/171 |
| 5,787,480 A | | 7/1998 | Scales et al. | 711/148 |
| 5,805,795 A | | 9/1998 | Whitten | 714/38 |
| 5,835,705 A | | 11/1998 | Larsen et al. | 714/47 |
| 5,850,554 A | | 12/1998 | Carver | 717/10 |
| 5,860,024 A | * | 1/1999 | Kyle et al. | 710/6 |
| 5,864,867 A | | 1/1999 | Krusche et al. | 707/104.1 |
| 5,867,649 A | | 2/1999 | Larson | 709/201 |
| 5,872,977 A | | 2/1999 | Thompson | 717/3 |
| 5,905,488 A | | 5/1999 | Demers et al. | 345/173 |
| 5,905,856 A | | 5/1999 | Ottensooser | 714/38 |
| 5,963,975 A | | 10/1999 | Boyle et al. | 711/147 |
| 5,974,536 A | | 10/1999 | Richardson | 712/215 |
| 5,978,892 A | | 11/1999 | Noel et al. | 711/170 |
| 5,991,708 A | * | 11/1999 | Levine et al. | 702/186 |
| 5,991,893 A | | 11/1999 | Snider | 714/4 |
| 6,009,514 A | * | 12/1999 | Henzinger et al. | 712/236 |
| 6,016,474 A | | 1/2000 | Kim et al. | 705/1 |
| 6,018,793 A | | 1/2000 | Rao | 711/150 |
| 6,044,438 A | | 3/2000 | Olnowich | 711/130 |
| 6,052,708 A | | 4/2000 | Flynn et al. | 709/104 |
| 6,055,368 A | | 4/2000 | Kunioka | 703/13 |
| 6,065,019 A | | 5/2000 | Ault et al. | 707/206 |
| 6,077,312 A | | 6/2000 | Bates et al. | 717/129 |
| 6,081,868 A | | 6/2000 | Brooks | 711/3 |
| 6,085,029 A | | 7/2000 | Kolawa et al. | 714/38 |
| 6,098,169 A | | 8/2000 | Ranganathan | 712/227 |
| 6,101,525 A | | 8/2000 | Hecker | 709/104 |
| 6,119,198 A | | 9/2000 | Fromm | 711/5 |
| 6,125,430 A | | 9/2000 | Noel et al. | 711/152 |
| 6,173,327 B1 | | 1/2001 | De Borst et al. | 709/231 |
| 6,205,537 B1 | * | 3/2001 | Albonesi | 712/43 |
| 6,223,134 B1 | * | 4/2001 | Rust et al. | 702/121 |
| 6,253,252 B1 | | 6/2001 | Schofield | 709/315 |
| 6,263,485 B1 | | 7/2001 | Schofield | 717/114 |
| 6,269,457 B1 | | 7/2001 | Lane | 714/38 |
| 6,286,130 B1 | | 9/2001 | Poulsen et al. | 717/119 |
| 6,311,320 B1 | | 10/2001 | Jibbe | 717/111 |
| 6,351,845 B1 | | 2/2002 | Hinker et al. | 717/128 |
| 2001/0051974 A1 | | 12/2001 | Saad | 709/202 |
| 2002/0046201 A1 | | 4/2002 | Hembry | 707/1 |
| 2002/0078010 A1 | | 6/2002 | Ehrman et al. | 701/1 |

OTHER PUBLICATIONS

Haggander et al., "Optimizing Dynamic Memory Management in a Multithreaded Application Executing on a Multiprocessor," International Conference on Parallel Processing, Minneapolis, MN, Aug. 10–14, 1998, pp. 262–269.

Larson et al., "Memory Allocation for Long–Running Server Applications," ISMM 1998, International Symposium on Memory Management, Vancouver, BC, Canada, Oct. 17–19, 1998, vol. 34, No. 3, pp. 176–185.

"Algorithm Visualization System: Introduction," available online at: www.cp/eng.chula.ac.th/faculty/spj/research/avis/intro.html as of Jun. 10, 1999, 2 pages.

"Caching Objects In A Data Space," IBM Technical Disclosure Bulletin, IBM Corp., vol. 37, No. 10, Oct. 1994, pp. 587–590.

"GeoMAMOS Project Home Page," available online at: www.ece.nwu.edu/~theory/geomamos.html as of Jun. 10, 1999, 4 pages.

"Introduction," available online at: www.ece.nwu.edu/~theory/gs_tech_1_html/section 3_1.html as of Jun. 10, 1999, 3 pages.

"Pentium Processor Family User Manual vol. 3: Architecture and Programming Manual," pp. 25–182, 25–183, 25–309, and 25–310, Intel Corp., (1994).

"Purify for Windows NT, Product Overview," Ver. 6.0, available online at: www.rational.com/products/purify_nt/prodinfo/index.jtmpl as of Jan. 11, 1999, 3 pages.

"Scientific Simulations and Algorithm Visualizations Using NESL and Java," available online at: www.cs.cmu.edu/~scandal/applets/ as of Jun. 10, 1999, 1 page.

"Visualization for Developing Geometric Algorithms," available online at: www.ece.nwu.edu/~theory/gs_tech_1_html/section3_3.html as of Jun. 10, 1999, 2 pages.

Attali et al., "Semantic–Based Visualization for Parallel Object–Oriented Programming," Proceedings of the 11th Annual Conference on Object Oriented Programing Systems, 1996, pp. 421–440.

Barry Wilkinson et al., "Parallel Programming," Prentice Hall, 1999.

Conradi et al., "Version Models for Software Configuration Management," ACM Computing Surveys, vol. 30, No. 2, Jun. 1998, pp. 232–282.

David E. Culler et al., "Parallel Computer Architecture", Morgan Kaufman Publishers, Inc., San Francisco, California, 1999.

Ian Foster, "Designing and Building Parallel Programs", Addison–Wesley Publishing Company, 1995.

Kevin Dowd and Charles R. Severance, "High Performance Computing," Second Edition, Chapter 10, Shared Memory Multiprocessors, Aug. 1998, pp. 216–218.

Sun Microsystems Computer Company, "Prism 5.0 Reference Manual," Revision A., Nov. 1997.

Wasserman et al., "A Graphical, Extensible Integrated Environment for Software Development," Proceedings of the ACD SIGSOFT/SIGPLAN Software Engineering Symposium on Practical Software Development Environments, 1986, pp. 131–142.

Sun Microsystems, UltraSPARC™ User's Manual, UltraSPARC–1, UltraSPARC–II, Jul. 1997, pp. 319–325.

"dcpid –DIGITAL Continuous Profiling Infrastructure daemon", Man pages for SCR–Installed Programs (Alpha/NT), Online <URL:http://research.compaq.com/SRC/dcpi/html/ntalpha/dcpi.html>, 1997, pp. 1–6.

Brown et al., "PAPI: Portable Interface to Hardware Performance Counters," Cewes Major Shared Resources Center Pet Technical Reports, vol. 99–06, 1999, Online, <URL:http://www.wes.hpc.mil/pet/tech_reports/reports/pdf/tr_9906.pdf>, pp. 3–13.

IBM Technical Disclosure Bulletin, "Internal Performance Measurement Counters," IBM Corp., vol. 34, No. 4A, Sep. 1991, pp. 51–52 (the whole document).

IBM Technical Disclosure Bulletin, "Simultaneous Viewing of Performance Monitor Data Independent of Counters," IBM Corp., vol. 39, No. 10, Oct. 1996, pp. 181–183.

Zagha et al., "Performance Analysis Using the MIPS R10000 Performance Counters", SC96 Technical Papers, Online, <URL:http://www.supercomp.org/sc96/proceedings/SC96PROC/ZAGHA/INDEX.HTM>, Nov. 1996, pp. 1–22.

Nathan P. Kropp, Philip J. Koopman, Daniel P. Siewiorek, "Automated Robustness Testing of Off–the–Shelf Software Components," Institute for Complex Engineered Systems, Carnegie Mellon University, Pittsburgh, PA, pp. 230–239, IEEE (1998).

Valvano, "Debugging Strategies," Chapter 6, pp. 6.1–6.10, Real Time Debugging, Online Manual, Jun. 7, 1999, Retrieved from the Internet: <URL:http://www.ece.utexas.edu/{valvano/EE360P/PDF/Ch6.pdf>.

* cited by examiner

| PERFORMANCE INDICATOR | USER SELECTED? | MEASURED? |
|---|---|---|
| First performance indicator | TRUE | TRUE |
| Second performance indicator | TRUE | TRUE |
| Third performance indicator | TRUE | FALSE |
| Fourth performance indicator | TRUE | NULL |
| Fifth performance indicator | FALSE | NULL |
| Sixth performance indicator | TRUE | FALSE |
| Seventh performance indicator | TRUE | FALSE |
| Eighth performance indicator | FALSE | NULL |
| Ninth performance indicator | TRUE | FALSE |

FIG. 3

| PERFORMANCE INDICATOR | OCCURRENCE COUNT TOTAL | TIME TOTAL (SECONDS) | CYCLE COUNT |
|---|---|---|---|
| First performance indicator | 1916 | 10 | 5432 |
| Second performance indicator | 1798 | 10 | 6241 |
| Third performance indicator | 0 | 0 | 0 |
| Fourth performance indicator | 0 | 0 | 0 |
| Fifth performance indicator | 0 | 0 | 0 |
| Sixth performance indicator | 0 | 0 | 0 |
| Seventh performance indicator | 0 | 0 | 0 |
| Eighth performance indicator | 0 | 0 | 0 |
| Ninth performance indicator | 0 | 0 | 0 |

METHOD AND APPARATUS FOR MULTIPLEXING HARDWARE PERFORMANCE INDICATORS

FIELD OF THE INVENTION

The present invention relates to the field of processor performance instrumentation, and more particularly to multiplexing multiple performance indicators during processor performance instrumentation.

BACKGROUND OF THE INVENTION

A computer processor, such as a central processing unit, performs instructions under the direction of software programs. These instructions include loading memory, accessing cache, etc., and they consume processor resources. It is useful for computer software testers to measure how often the processor performs instructions under the direction of a program in order to measure the performance of the program. As a result, processor designers include hardware "counters" in the processor that count the number of times the processor performs specific instructions or the number of times a particular event occurs. These counters are often called "Performance Instrumentation Counters," and the instructions or events they count, or measure, are often called "performance indicators." Further, this field is generally called "processor performance instrumentation."

The number of hardware counters, however, is usually less than the number of performance indicators the tester needs to measure. For instance, there may be sixteen indicators to measure, but only two hardware counters, allowing the tester to measure only two of the sixteen indicators at a time. In order to measure the performance of the program with regard to all sixteen indicators, the tester must run the program multiple times. In this example, the tester must run the program eight times (sixteen indicators divided by two counters) to measure the performance of the program with respect to all the sixteen indicators. This procedure is inconvenient and time consuming.

One solution to this problem would be to have as many hardware counters as performance indicators to measure. Then, the tester could measure all the indicators with one run of the program. Added hardware counters, however, would increase the cost of the processor. Thus, it is desirable to count all the performance indicators during a single run of a program without adding more hardware counters to the processor.

SUMMARY OF THE INVENTION

In accordance with methods and systems consistent with the present invention, an improved processor performance instrumentation system is provided that allows a software tester to measure more performance indicators than there are hardware counters during a single execution of a tested program. The improved processor performance instrumentation system accomplishes this by "multiplexing" performance indicators while executing the tested program. In effect, methods and systems consistent with the present invention extend the abilities of the limited number of hardware counters to allow them to measure a number of performance indicators otherwise not allowed during one execution of the tested program.

In accordance with methods consistent with the present invention, a method is provided in a data processing system for running a tested program. In accordance with this method, while the tested program runs, the method selects one of a plurality of performance indicators and instructs a processor to initialize a performance counter. Methods consistent with the present invention instruct the processor to measure the selected performance indicator and record measured data from the performance counter when a predetermined time period has expired after instructing the processor to measure. Finally, methods consistent with the present invention repeat the steps of selecting one of the performance indicators, instructing the processor to initialize the performance counter, instructing the processor to measure the selected performance indicator, and recording the measured data such that each of the predetermined plurality of performance indicators is measured by the performance counter.

In accordance with systems consistent with the present invention, an apparatus is provided containing a memory and a processor. The processor contains a performance instrumentation counter. The memory contains a tested program and a multiplexing application. The multiplexing application contains first code to run the tested program. The multiplexing application contains second code to select one of a plurality of performance indicators, and third code to instruct the processor to initialize the performance counter. The multiplexing application also contains fourth code to instruct the processor to measure the selected performance indicator and fifth code to record measured data from the performance counter when a predetermined time period has expired after instructing the processor to measure. Finally, the multiplexing application contains sixth code to repeat selecting one of the performance indicators, instructing the processor to initialize the performance counter, instructing the processor to measure the selected performance indicator, and recording the measured data such that each of the predetermined plurality of performance indicators is measured by the performance counter.

The summary and the following detailed description should not restrict the scope of the claimed invention. Both provide examples and explanations to enable others to practice the invention.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIGS. 3 and 4 depict a more detailed diagram of the data storage space depicted in FIG. 1

DETAILED DESCRIPTION OF THE INVENTION

Overview

The following description of embodiments of the present invention refers to the accompanying drawings. Where appropriate, the same reference numbers in different drawings refer to the same or similar elements.

In accordance with methods and systems consistent with the present invention, an improved processor performance instrumentation system is provided that allows a software tester to measure more performance indicators than there are hardware counters during a single execution of a tested program. The improved processor performance instrumentation system accomplishes this by "multiplexing" performance indicators while executing the tested program.

In using such an improved processor performance system, the user chooses the performance indicators to measure. While the tested software program is running, systems or methods consistent with the present invention select one or more of the performance indicators, and measure and record the selected performance indicator during a pre-determined time period. Such an improved processor performance system then selects another one or more performance indicators, which are and measured and recorded during the predetermined time period. Such an improved processor performance system selects new performance indicators until all the user's chosen performance indicators are measured. After measuring all the performance indicators, such methods and systems start over and measures all the performance indicators. Such methods and systems repeat until the tested program stops executing. Thus, the performance indicators are multiplexed during the execution of the tested program. This allows the software tester to measure, in one pass of the tested program, a greater number of performance indicators than there are hardware counters.

Implementation Details

Figure 1:
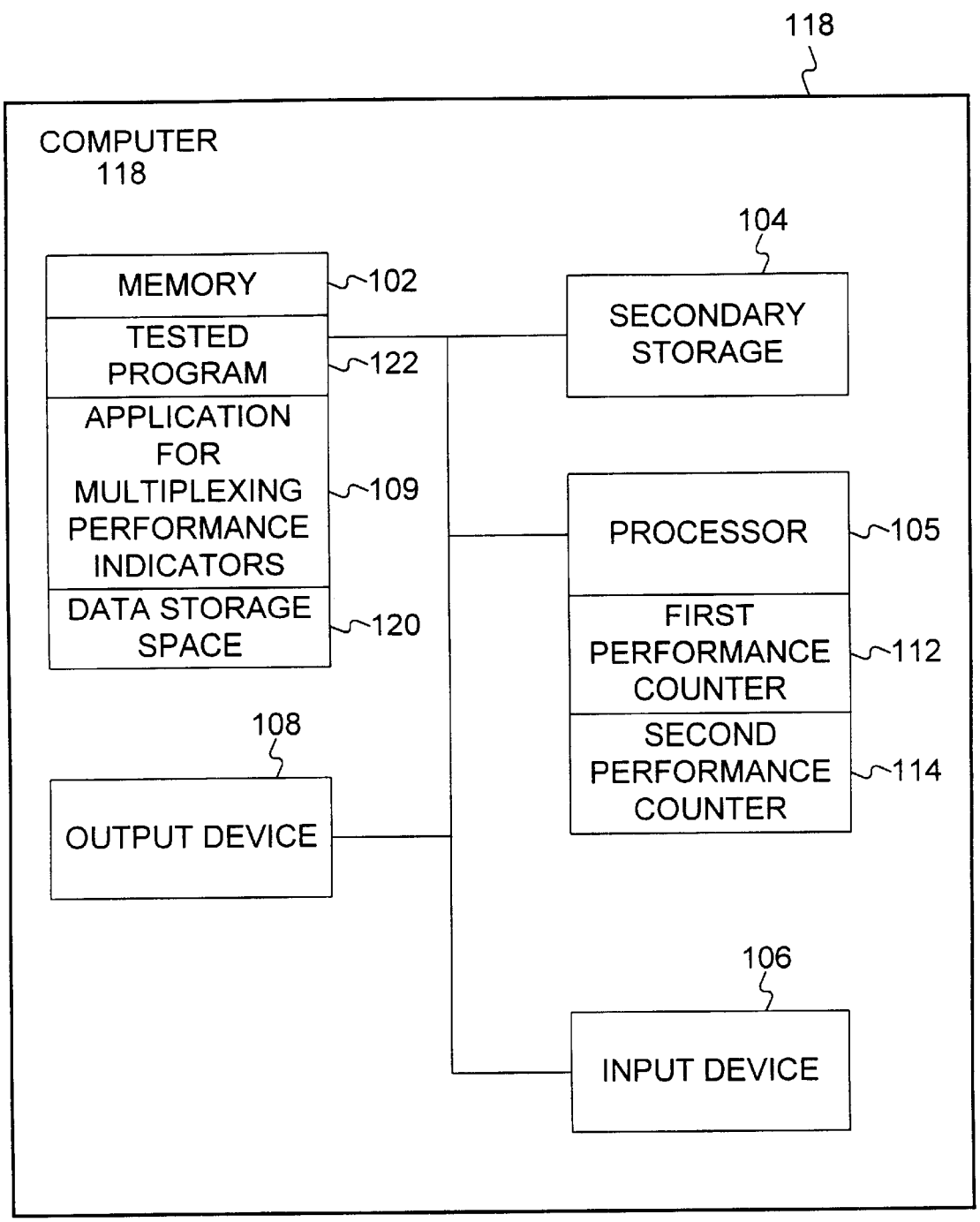
FIG. 1 depicts a data processing system suitable for use with methods and systems consistent with this present invention.

FIG. 1 depicts a data processing system suitable for use with methods and systems consistent with the present invention. Computer 118 includes a memory 102, a secondary storage device 104, a processor 105 such as a central processing unit (CPU), an input device 106, and an output device 108. Input device 106 may comprise a keyboard, a mouse, or both. Output device 108 may be a cathode ray tube (CRT) that can display a graphical user interface (GUI). Memory 102 stores an application 109 used to multiplex multiple performance indicators. Memory 102 also contains a data storage space 120 for storing data while multiplexing application 109 is running. Memory 102 also stores a program 122 that multiplexing application 109 tests.

Processor 105 comprises a first performance counter 112 and a second a performance counter 114. First performance counter 112 and second performance counter 114 each are capable of measuring one performance indicator at a single time. In another embodiment consistent with the present invention, there are more than two performance counters. In yet another embodiment consistent with the present invention, there is only one performance counter.

The hardware counters are "Performance Instrumentation Counters" and they count "performance indicators." For example, in the ULTRASPARC™ processor available from SUN MICROSYSTEMS™, there are two PICs, each of which can measure twelve performance indicators, but one at a time. Table I provides the performance indicator variable name and description for the first PIC in an ULTRASPARC™.

TABLE I

Performance Indicator Variable Name and
Description or first PIC in ULTRASPARC ™

| Performance Indicator Variable Name | Description of Performance Indicator |
|---|---|
| Cycle_cnt | Accumulated cycles |
| Instr_cnt | Number of instructions completed |
| Dispatch0_IC_miss | I-buffer is empty from I-Cache miss |
| Dispatch0_storeBuf | Store buffer cannot hold additional stores, and a store instruction is the first instruction in the group |
| IC_ref | I-Cache references. |
| DC_rd | D-Cache read references |
| DC_wr | D-Cache write references |
| Load_use | An instruction in the execute stage depends on an earlier load result that is not yet available |
| EC_ref | Total E-Cache references |
| EC_write_hit_RDO | E-Cache hits that do a read for ownership UPA transaction |
| EC_snoop_inv | E-Cache invalidates |
| BC_rd hit | E-Cache read hits from D-Cache misses |

Table II provides the performance indicator variable name and description for the second PIC in an ULTRASPARC™.

TABLE II

Performance Indicator Variable Name and
Description for second PIC in ULTRASPARC ™

| Performance Indicator Variable Name | Description of Performance Indicator |
|---|---|
| Cycle_cnt | Accumulated cycles |
| Instr_cnt | Number of instructions completed |
| Dispatch0_mispred | I-buffer is empty from Branch misprediction |
| Dispatch0_FP_use | First instruction in the group depends on an earlier floating point result that is not yet available, but only while the earlier instruction is not stalled for a Load_use |

TABLE II-continued

Performance Indicator Variable Name and
Description for second PIC in ULTRASPARC ™

| Performance Indicator Variable Name | Description of Performance Indicator |
|---|---|
| IC_hit | I-Cache hits |
| DC_rd_hit | D-Cache read hits in one of two places |
| DC_wr_hit | D-Cache write hits |
| Load_use_RAW | There is a load use in the execute stage and there is a read-after-write hazard on the oldest outstanding load |
| EC_hit | Total E-Cache hits |
| EC_wb | E-Cache misses that do writebacks |
| EC_snoop_cb | E-Cache snoop copy-backs |
| EC_ic_hit | E-Cache read hits from I-Cache misses |

As evident from the tables, some performance indicators are common to both the first PIC and the second PIC. Some performance indicators are found only on one of the two PICs. This table and a description of Performance Instrumentation is found in Appendix B of the ULTRASPARC™ User's Manual from SUN MICROSYSTEMS™, July, 1997, which is incorporated herein by reference.

Figure 2:
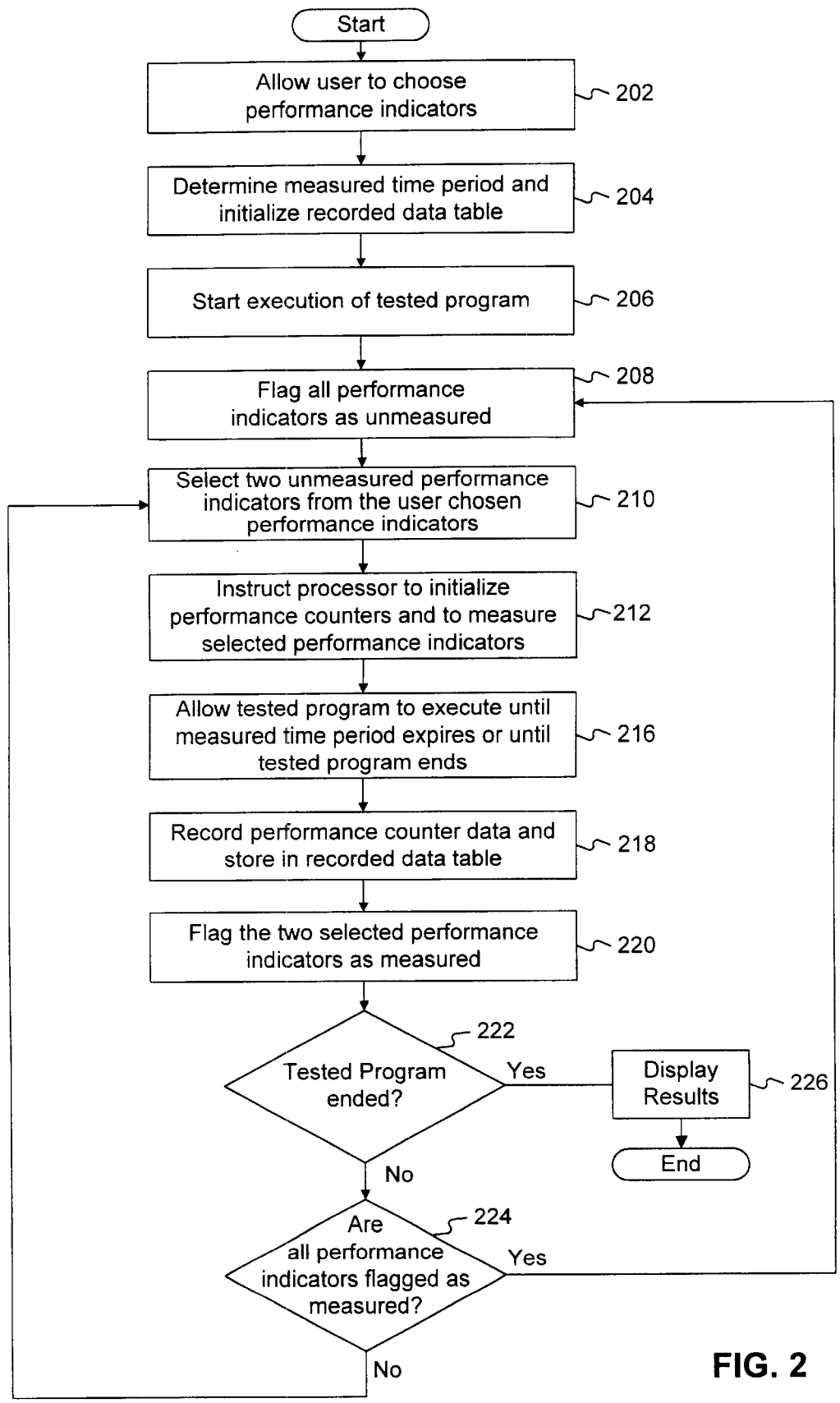
FIG. 2 depicts a flowchart of the steps performed by the application for multiplexing performance indicators depicted in FIG. 1.

FIG. 2 depicts a flowchart of the steps performed by the multiplexing application 109 in accordance with methods and systems consistent with the present invention. The first step performed by the multiplexing application 109 is to allow the user to choose a plurality of performance indicators (step 202). The user may do this through a GUI with a keyboard or mouse, or both. A list of all possible performance indicators be may stored in a data storage space 120. FIG. 3 depicts a more detailed diagram of data storage space 120, including a table 302 that includes a list of all the possible performance indicators in a first column 304. Multiplexing program 109 flags user chosen performance indicators by inserting a "TRUE" in a second column 306. Performance indicators not chosen by the user are flagged "FALSE" in the second column 306. The user may choose one or more performance indicators, including a number that is larger than the number of hardware counters present. The user chosen performance indicators will be measured by multiplexing application 109 while tested program 122 runs. Performance indicators not chosen will be ignored by multiplexing application 109.

After the user chooses performance indicators, multiplexing application 109 then performs the step of determining a measured time period for measuring the user chosen performance indicators (step 204). To do this, program 109 may use a number of different algorithms. In one embodiment, the algorithm is based on the bit length of performance counters 112, 114 and the speed of processor 105. For instance, the bit-length of the performance counter in the SUN ULTRASPARC™ processor is thirty-two bits. This means that the performance counter can count from a minimum of zero to a maximum of $2^{32}-1$ occurrences of a performance indicator. Once the performance counter reaches $2^{32}-1$, it "wraps around" quietly and starts counting at zero again. Therefore, multiplexing application 109 reads and records the performance counter data before it resets to zero. In general, if "n" represents the bit length of the performance counter, the wrap around time in seconds is $2^n$ divided by the processor speed in cycles per second. Because of possible "interrupts," the measured time period, in this embodiment, is set to 80% of the wrap around time.

During step 204, multiplexing application 109 also initializes a recorded data table 402, which is shown in FIG. 4 that depicts a more detailed diagram of data storage space 120. Recorded data table 402 stores data accumulated while multiplexing application 109 is running so that application 109 can display results at a later time. Data table 402 may be stored in data storage space 120. Recorded data table 402 includes a list of all the possible performance indicators in a first column 404. A second column 406 stores the total number of occurrences of each performance indicator while each is measured. A third column 408 stores the total time each performance indicator is measured. In one embodiment, a fourth column 410 stores the total number of clock cycles that have occurred while each performance indicator is measured. During step 204, multiplexing application 109 sets all of these values in second column 406, third column 408, and fourth column 410 to zero.

Multiplexing application 109 then executes the tested program 122 (step 206). Tested program 122 is the program whose performance is measured. Multiplexing application then flags all the chosen performance indicators as unmeasured (step 208). FIG. 3 depicts a more detailed diagram of data storage space 120, including table 302 that includes a list of whether a performance indicator has been measured. Multiplexing application 109 flags measured performance indicators by inserting a "TRUE" in third column 308. Unmeasured performance indicators are flagged "FALSE." Performance indicators that will not be measured at all because the user did not choose them are flagged "NULL."

Multiplexing application 109 then selects two unmeasured performance indicators from the user chosen performance indicators (step 210). In another embodiment, if there is only one performance counter then the application 109 would only select one unmeasured performance indicator. Likewise, in the embodiment where there are more than two performance counters, then multiplexing application 109 selects a number of performance indicators equal to the number of performance counters.

Multiplexing application 109 then instructs processor 105 to initialize performance counters 112, 114 to zero (step 212), and instructs processor 105 to measure the selected performance indicators (step 214) that multiplexing application 109 selected in step 210. Tested program 122 continues to execute (step 216). When the measured time period expires or when the tested program ends, multiplexing application 109 reads the performance counter data (step 218). This data is summed to the value in second column 406 corresponding to the appropriate selected performance indicators. Likewise, multiplexing application 109 increments the total time in third column 408 by the time the performance indicators were measured.

Multiplexing application 109 then flags the two selected performance indicators as measured (step 220) by inserting a "TRUE" in third column 308 of table 302. For instance, in table 302, the first performance indicator and the second performance indicator are flagged as measured. The third, sixth, seventh, eighth, and ninth performance indicators are flagged as unmeasured. The fourth and fifth performance indicators are flagged "NULL" because the user did not choose them for measurement.

If tested program 122 has not ended (step 222), then the multiplexing application 109 determines if all the performance indicators are flagged as measured (step 224). If all the performance indicators are flagged as measured, then multiplexing application 109 flags all the performance indicators as unmeasured (step 208) and continues to step 210 to gather more data. If there are unmeasured performance indicators (step 224), then multiplexing application 109 selects two unmeasured performance indicators from the user chosen performance indicators (step 210) and continues to step 212.

In another embodiment, multiplexing application 109 selects one new unmeasured performance indicator and retains the other previously selected performance indicator. For instance, the retained performance indicator may be the clock cycle count. Therefore, multiplexing application 109 may record the number of clock cycles during each measured time period. Multiplexing application places this data in fourth column 410 of recorded data table 402.

If tested program 122 ended (step 222), multiplexing application 109 displays the results (step 226), for example on display device 103. To display results, multiplexing program 109 displays recorded data table 402. After displaying the results, multiplexing application 109 ends.

One skilled in the art will appreciate that numerous variations to this system exist. For example, the measured time period can be selected in any fashion that is prevents the counters from resetting and losing data. As another example, the data may be tabulated and displayed in any fashion.

Although methods and systems consistent with the present invention have been described with reference to a preferred embodiment thereof, those skilled in the art knows various changes in form and detail which may be made without departing from the spirit and scope of the present invention as defined in the appended claims and their full scope of equivalents.

What is claimed is:

1. A computer-readable medium containing instructions for controlling a computer system to perform a method of operating a processor comprising a performance counter capable of measuring a plurality of performance indicators, the method comprising:
   running a tested program; and
   while the tested program is running,
      selecting one of the performance indicators;
      instructing the processor to initialize the performance counter;
      instructing the processor to measure the selected performance indicator;
      recording a measured datum from the performance counter when a predetermined time period has expired after instructing the processor to measure; and
      repeating the steps of selecting one of the performance indicators, instructing the processor to initialize the performance counter, instructing the processor to measure the selected performance indicator, and recording the measured datum such that each of the predetermined plurality of performance indicators is measured by the performance counter.

2. The computer-readable medium of claim 1, wherein the processor comprises a plurality of performance counters and the number of performance indicators is greater than the number of performance counters, and wherein the method further includes the step of:
   selecting one of the plurality of performance counters for instructing the processor to initialize.

3. The computer-readable medium of claim 1, wherein the method further includes the step of:
   receiving the plurality of performance indicators from user input.

4. The computer-readable medium of claim 1, wherein the processor has a processor clock speed, wherein the performance counter has a bit length, and wherein the method further includes the step of:
   calculating the predetermined time period equal to approximately eighty percent of the quantity of 2 raised to a power equal to the performance counter bit length, divided by the processor clock speed.

5. The computer-readable medium of claim 1, wherein the method further includes the step of:
   receiving the predetermined time period from user input.

6. The computer-readable medium of claim 1, wherein the step of recording the measured datum further includes the step of:
   recording the measured datum in a recorded data table.

7. The computer-readable medium of claim 6, wherein the method further includes the step of:
   displaying the recorded data table.

8. A method for measuring a predetermined plurality of performance indicators in a processor comprising a performance counter capable of measuring the plurality of performance indicators, the method comprising:
   running a tested program; and
   while the tested program is running,
      selecting one of the performance indicators;
      instructing the processor to initialize the performance counter;
      instructing the processor to measure the selected performance indicator;
      recording a measured datum from the performance counter when a predetermined time period has expired after instructing the processor to measure; and
      repeating the steps of selecting one of the performance indicators, instructing the processor to initialize the performance counter, instructing the processor to measure the selected performance indicator, and recording the measured datum such that each of the predetermined plurality of performance indicators is measured by the performance counter.

9. The method of claim 8, wherein the processor comprises a plurality of performance counters and the number of performance indicators is greater than the number of performance counters, and wherein the method further includes the step of:
   selecting one of the plurality of performance counters for instructing the processor to initialize.

10. The method of claim 8, further including the step of:
    receiving the plurality of performance indicators from user input.

11. The method of claim 8, wherein the processor has a processor clock speed, wherein the performance counter has a bit length, and wherein the method further includes the step of:

calculating the predetermined time period equal to approximately eighty percent of the quantity of 2 raised to a power equal to the performance counter bit length, divided by the processor clock speed.

12. The method of claim 8, further including the step of:
receiving the predetermined time period from user input.

13. The method of claim 8, wherein the step of recording the measured datum further includes the step of:
recording the measured datum in a recorded data table.

14. The method of claim 13, further including the step of:
displaying the recorded data table.

15. An apparatus, comprising:
a processor containing a performance counter, the processor configured to run a tested program and a multiplexing program; and
a memory, containing:
the tested program; and
the multiplexing program configured to initiate execution of the tested program, and while the tested program is running, the multiplexing program is configured to select one of a plurality of performance indicators, instruct the processor to initialize the performance counter, instruct the processor to measure the selected performance indicator, record a measured datum from the performance counter when a predetermined time period has expired after instructing the processor to measure, and repeat selecting one of the performance indicators, instructing the processor to initialize the performance counter, instructing the processor to measure the selected performance indicator, and recording the measured datum such that each of the predetermined plurality of performance indicators is measured by the performance counter.

16. The apparatus of claim 15, wherein the processor comprises a plurality of performance counters and the number of performance indicators is greater than the number of performance counters, and wherein the multiplexing program is further configured to select one of the plurality of performance counters for instructing the processor to initialize.

17. The apparatus of claim 15, wherein the multiplexing program is further configured to receive the plurality of performance indicators from user input.

18. The apparatus of claim 15, wherein the processor has a processor clock speed, wherein the performance counter has a bit length, and wherein the multiplexing program is further configured to calculate the predetermined time period equal to approximately eighty percent of the quantity of 2 raised to a power equal to the performance counter bit length, divided by the processor clock speed.

19. The apparatus of claim 15, wherein the multiplexing program is further configured to receive the predetermined time period from user input.

20. The apparatus of claim 15, wherein the multiplexing program is further configured to record the measured datum in a recorded data table.

21. The apparatus of claim 20, wherein the multiplexing program is further configured to display the recorded data table.

22. A apparatus for measuring a predetermined plurality of performance indicators in a processor comprising a performance counter capable of measuring the plurality of performance indicators, the apparatus comprising:
means for running a tested program; and
while the tested program is running,
means for selecting one of the performance indicators;
means for instructing the processor to initialize the performance counter;
means for instructing the processor to measure the selected performance indicator;
means for recording a measured datum from the performance counter when a predetermined time period has expired after instructing the processor to measure; and
means for repeating the steps of selecting one of the performance indicators, instructing the processor to initialize the performance counter, instructing the processor to measure the selected performance indicator, and recording the measured datum such that each of the predetermined plurality of performance indicators is measured by the performance counter.

23. The apparatus of claim 22, wherein the processor comprises a plurality of performance counters and the number of performance indicators is greater than the number of performance counters, and wherein the apparatus further includes:
means for selecting one of the plurality of performance counters for instructing the processor to initialize.

24. The apparatus of claim 22, further including:
means for receiving the plurality of performance indicators from user input.

25. The apparatus of claim 22, wherein the processor has a processor clock speed, wherein the performance counter has a bit length, and wherein the apparatus further includes:
means for calculating the predetermined time period equal to approximately eighty percent of the quantity of 2 raised to a power equal to the performance counter bit length, divided by the processor clock speed.

26. The apparatus of claim 22, further including:
means for receiving the predetermined time period from user input.

27. The apparatus of claim 22, wherein the means for recording the measured datum further includes:
means for recording the measured datum in a recorded data table.

28. The apparatus of claim 27, further including:
means for displaying the recorded data table.

29. A method for measuring a predetermined plurality of performance indicators in a processor comprising a performance counter capable of measuring the plurality of performance indicators, the method comprising:
running a tested program; and
during a single run of the tested program,
instructing the processor to measure the plurality of performance indicators; and
recording measured data from the performance counter indicative of the plurality of performance indicators.

30. The method of claim 29, wherein the step of instructing the processor further includes the steps of:
selecting one of the performance indicators;
instructing the processor to initialize the performance counter;
instructing the processor to measure the selected performance indicator; and
wherein the step of recording measured data further includes the step of:
recording the measured data from the performance counter when a predetermined time period has expired after instructing the processor to measure.

31. The method of claim 30, wherein the processor comprises a plurality of performance counters and the number of performance indicators is greater than the number of performance counters, and wherein the method further includes the step of:

selecting one of the plurality of performance counters for instructing the processor to initialize.

32. The method of claim 30, further comprising the step of:

calculating the predetermined time period equal to approximately eighty percent of a quantity of 2 raised to a power equal to a bit length for the performance counter divided by a clock speed for the processor.

33. The method of claim 30, wherein the method further includes the step of:

receiving the predetermined time period from user input.

34. The method of claim 29, wherein the method further includes the step of:

receiving the plurality of performance indicators from user input.

35. The method of claim 29, wherein the step of recording the measured datum further includes the step of: recording the measured datum in a recorded data table.

36. The method of claim 35, wherein the method further includes the step of:

displaying the recorded data table.

\* \* \* \* \*